US009833849B2

(12) United States Patent
Knight

(10) Patent No.: US 9,833,849 B2
(45) Date of Patent: Dec. 5, 2017

(54) MITER SAW

(71) Applicant: TTI (MACAO COMMERCIAL OFFSHORE) LIMITED, Macau (MO)

(72) Inventor: Walter Knight, Anderson, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 109 days.

(21) Appl. No.: 14/997,875

(22) Filed: Jan. 18, 2016

(65) Prior Publication Data

US 2017/0203375 A1 Jul. 20, 2017

(51) Int. Cl.
*B23D 47/02* (2006.01)
*B23D 45/02* (2006.01)

(52) U.S. Cl.
CPC .......... *B23D 47/02* (2013.01); *B23D 45/024* (2013.01)

(58) Field of Classification Search
CPC .............................. B23D 47/02; B23D 45/024
USPC .............................. 83/468.3, 471, 471.3, 473
See application file for complete search history.

(56) References Cited

U.S. PATENT DOCUMENTS

| | | | | |
|---|---|---|---|---|
| 3,821,918 A | * | 7/1974 | Niehaus ............... | B23D 45/044 83/471.3 |
| 3,948,136 A | * | 4/1976 | Gutowski ............... | B27G 5/02 83/581 |
| 4,011,782 A | * | 3/1977 | Clark ................... | B23D 45/044 83/471.3 |
| 4,934,233 A | * | 6/1990 | Brundage ............. | B23D 45/044 83/397 |
| 5,054,352 A | | 10/1991 | Fushiya et al. | |
| 5,063,805 A | * | 11/1991 | Brundage ............. | B23D 45/044 83/468.3 |
| 5,191,821 A | * | 3/1993 | Metzger, Jr. ........... | B23D 47/04 269/6 |
| 5,207,141 A | | 5/1993 | Dehari et al. | |
| 5,249,496 A | | 10/1993 | Hirsch et al. | |
| 5,383,382 A | | 1/1995 | Garuglieri et al. | |
| 5,406,873 A | | 4/1995 | Garuglieri et al. | |
| 5,595,124 A | * | 1/1997 | Wixey ................. | B23D 47/025 108/22 |
| 5,644,964 A | | 7/1997 | Price | |
| 5,791,224 A | * | 8/1998 | Suzuki ................. | B23D 45/044 83/471.3 |
| 5,802,943 A | | 9/1998 | Brunson et al. | |
| 5,819,624 A | * | 10/1998 | Brault .................. | B23D 45/048 83/471.3 |
| 5,862,732 A | | 1/1999 | Itzov | |

(Continued)

FOREIGN PATENT DOCUMENTS

EP 0234215 3/1990
EP 1256407 2/2005

(Continued)

*Primary Examiner* — Sean Michalski
(74) *Attorney, Agent, or Firm* — Michael Best & Friedrich LLP

(57) ABSTRACT

A miter saw including a base, a turntable pivotably coupled to the base about a miter axis, and a miter angle lock assembly. The miter angle lock assembly includes a clamp biased into engagement with the base when in a clamped position, thereby exerting a clamping force on the base for locking the turntable relative to the base. The miter angle lock assembly further includes an override assembly for maintaining the clamp in a released position relative to the base in which the clamping force is released.

20 Claims, 11 Drawing Sheets

(56) References Cited

U.S. PATENT DOCUMENTS

| | | |
|---|---|---|
| 5,870,938 A | 2/1999 | Brunson et al. |
| 5,870,939 A * | 2/1999 | Matsubara ............ B23D 45/048 83/471.3 |
| 6,016,732 A * | 1/2000 | Brault ................... B23D 45/048 83/471.3 |
| 6,032,562 A | 3/2000 | Brunson et al. |
| 6,067,885 A | 5/2000 | Brunson et al. |
| 6,289,778 B1 * | 9/2001 | Wixey ................... B23D 45/048 83/471.3 |
| 6,474,206 B1 * | 11/2002 | Brunson ............... B23D 45/044 108/139 |
| 6,513,412 B2 * | 2/2003 | Young ................... B23D 45/044 83/471.3 |
| 6,631,661 B2 | 10/2003 | Brunson et al. |
| 6,658,977 B2 * | 12/2003 | Chang ................... B23D 45/044 83/471.3 |
| 6,758,123 B2 | 7/2004 | Svetlik et al. |
| 6,779,428 B2 * | 8/2004 | Kao ...................... B23D 45/048 83/469 |
| 6,810,780 B2 | 11/2004 | Ceroll et al. |
| 7,013,780 B2 | 3/2006 | Brunson |
| 7,013,781 B2 | 3/2006 | Brunson et al. |
| 7,021,186 B2 | 4/2006 | Brazelle et al. |
| 7,114,425 B2 | 10/2006 | Romo et al. |
| 7,201,090 B2 * | 4/2007 | Svetlik ................. B23D 45/044 83/471.3 |
| 7,210,415 B2 | 5/2007 | Brunson |
| 7,275,470 B2 * | 10/2007 | Bettacchini ............ B27B 5/29 83/471.2 |
| 7,302,879 B2 | 12/2007 | Bergmann |
| 7,311,028 B2 | 12/2007 | Garcia et al. |
| 7,367,253 B2 | 5/2008 | Romo et al. |
| 7,530,297 B2 * | 5/2009 | Carroll ................. B23D 45/044 83/471.3 |
| 7,798,041 B2 | 9/2010 | Hetcher et al. |
| 7,827,890 B2 | 11/2010 | Gass et al. |
| 7,845,260 B2 | 12/2010 | Terashima et al. |
| 7,854,187 B2 | 12/2010 | Liu et al. |
| 7,861,633 B2 | 1/2011 | Talesky et al. |
| 7,938,050 B2 * | 5/2011 | Gehret ................. B23D 47/025 83/471 |
| 7,992,478 B2 | 8/2011 | Meredith et al. |
| 8,002,256 B2 | 8/2011 | Thomas |
| 8,047,111 B2 | 11/2011 | Ushiwata et al. |
| 8,061,251 B2 * | 11/2011 | Hetcher ............... B23D 45/044 83/471.3 |
| 8,079,294 B2 * | 12/2011 | Shibata ................ B23D 47/02 248/188.8 |
| 8,176,823 B2 | 5/2012 | Lawlor |
| 8,186,257 B2 * | 5/2012 | Heflin .................. B27B 9/04 83/471 |
| 8,313,094 B2 | 11/2012 | Thomas |
| 8,573,104 B2 * | 11/2013 | Thomas ................ B23D 47/00 83/471.3 |
| 8,607,678 B2 | 12/2013 | Gehret |
| 8,661,956 B2 * | 3/2014 | Thomas ............... B23D 45/044 83/468.1 |
| 8,677,872 B2 * | 3/2014 | Chiu ..................... B23D 47/025 83/471.3 |
| 8,695,468 B2 * | 4/2014 | Thomas ............... B23D 45/048 83/471 |
| 8,931,386 B2 | 1/2015 | Lawlor |
| 8,960,063 B2 * | 2/2015 | Kaye, Jr. .............. B23D 45/044 83/471.3 |
| 9,662,724 B1 * | 5/2017 | Knight ................. B23D 47/02 |
| 2001/0042429 A1 * | 11/2001 | Brunson ............... B23D 45/048 83/471.3 |
| 2002/0166433 A1 * | 11/2002 | Ceroll ................... B23D 45/048 83/471.3 |
| 2003/0200852 A1 * | 10/2003 | Romo ................... B23D 47/025 83/473 |
| 2004/0089125 A1 | 5/2004 | Schoene et al. |
| 2004/0154448 A1 * | 8/2004 | Romo ................... B23D 47/025 83/471.3 |
| 2005/0284276 A1 * | 12/2005 | Talesky ................ B23D 45/048 83/471.3 |
| 2006/0011038 A1 | 1/2006 | Gehret et al. |
| 2006/0016310 A1 | 1/2006 | Shaodong |
| 2006/0243113 A1 | 11/2006 | Kaye, Jr. et al. |
| 2006/0249000 A1 | 11/2006 | Meredith et al. |
| 2007/0214928 A1 | 9/2007 | Wikle et al. |
| 2008/0210073 A1 | 9/2008 | Zhang |
| 2008/0276784 A1 | 11/2008 | Zhang |
| 2009/0293691 A1 | 12/2009 | Gehret |
| 2011/0209593 A1 | 9/2011 | Kani et al. |
| 2013/0160628 A1 | 6/2013 | Chiu |
| 2013/0160630 A1 | 6/2013 | Groth |
| 2013/0263712 A1 | 10/2013 | Xu et al. |
| 2014/0224089 A1 | 8/2014 | Thomas |

FOREIGN PATENT DOCUMENTS

| | | |
|---|---|---|
| EP | 1570963 | 4/2008 |
| EP | 1955801 | 8/2008 |
| EP | 1697077 | 10/2008 |
| EP | 1935542 | 12/2009 |
| EP | 2116328 | 9/2010 |
| EP | 1818127 | 10/2011 |
| EP | 1618981 | 4/2012 |
| EP | 1894686 | 1/2014 |
| WO | 2005046918 | 5/2005 |
| WO | 2009154962 | 12/2009 |

* cited by examiner

MITER SAW

FIELD OF THE INVENTION

The invention relates to power tools, and more particularly to saws, such as miter saws, chop saws, etc.

BACKGROUND OF THE INVENTION

Miter saws are generally used for making miter cuts on workpieces. In order to make such a miter cut on a workpiece, the saw blade must be angularly adjusted to a desired miter angle relative to the base and the workpiece. Typically, miter saws enable a user to angularly adjust the saw blade to preset miter angles, such as 0°, 15°, 22.5°, 30°, and 45°. Once the saw blade has been adjusted to the desired miter angle, it is advantageous to lock the saw blade in position in order to make consistent, repeatable cuts.

SUMMARY OF THE INVENTION

The invention provides, in one aspect, a miter saw including a base, a turntable pivotably coupled to the base about a miter axis, and a miter angle lock assembly. The miter angle lock assembly includes a clamp biased into engagement with the base when in a clamped position, thereby exerting a clamping force on the base for locking the turntable relative to the base. The miter angle lock assembly further includes an override assembly for maintaining the clamp in a released position relative to the base in which the clamping force is released.

The invention provides, in another aspect, a miter saw including a base, a turntable pivotably coupled to the base about a miter axis, and a miter angle detent assembly. The miter angle detent assembly includes an actuator and a bi-stable cam mechanism. The bi-stable cam mechanism is operable to lock the turntable relative to the base at a desired miter angle by depressing the actuator a first instance, and is operable to permit relative movement between the turntable and the base about the miter axis by depressing the actuator a second instance.

The invention provides, in yet another aspect, a miter saw including a base, a turntable pivotably coupled to the base about a miter axis, a miter angle lock assembly, and a miter angle detent assembly. The miter angle lock assembly includes a clamp biased into engagement with the base when in a clamped position, thereby exerting a clamping force on the base for locking the turntable relative to the base. The miter angle lock assembly further includes an override assembly for maintaining the clamp in a released position relative to the base in which the clamping force is released. The miter angle detent assembly includes an actuator and a bi-stable cam mechanism. The bi-stable cam mechanism is operable to lock the turntable relative to the base at a desired miter angle by depressing the actuator a first instance, and is operable to permit relative movement between the turntable and the base about the miter axis by depressing the actuator a second instance.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
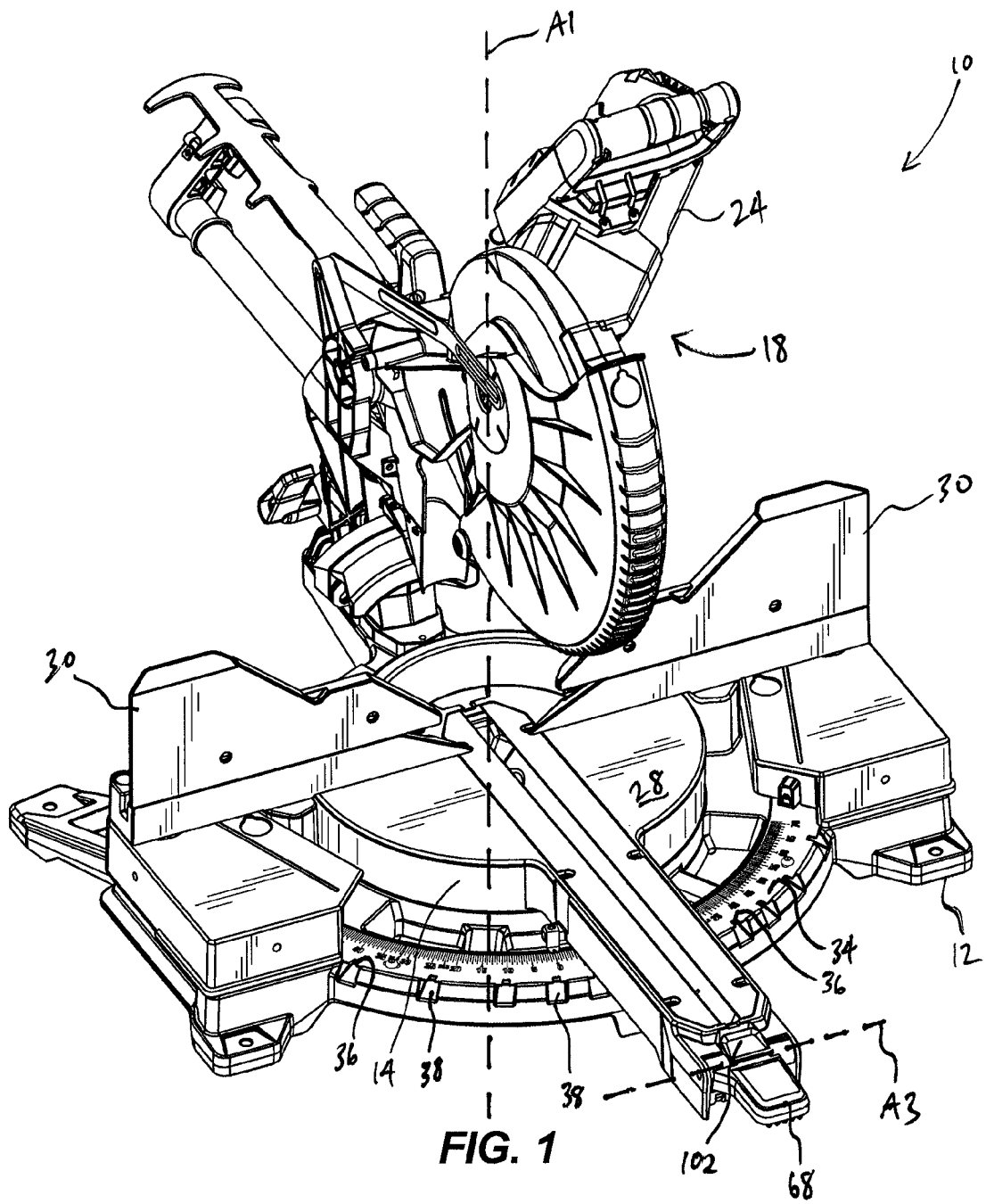
FIG. 1 is a front perspective view of a miter saw in accordance with an embodiment of the invention.

FIG. 1 illustrates a miter saw 10 including a base 12, a turntable 14 pivotably coupled to the base 12 about a miter axis A1, and a saw unit 18 pivotably coupled to the turntable 14 about a bevel axis. The saw unit 18 includes a saw blade (not shown), a motor 24 for rotating the saw blade, and an actuator (e.g., a trigger, also not shown) for activating and deactivating the motor 24. The turntable 14, and portions of the base 12, collectively define a workpiece support surface 28 upon which a workpiece may be placed for a cutting operation. The miter saw 10 also includes spaced fence assemblies 30 positioned on opposite sides of the saw blade against which the workpiece may be abutted during a cutting operation.

The miter saw 10 further includes a miter angle scale 34 attached to the base 12 that can be referenced by a user of the miter saw 10 to execute a miter cut on a workpiece. The miter angle scale 34 indicates the miter angle, about miter axis A1, to which the saw unit 18 is adjusted relative to the base 12. The miter angle scale 34 includes notches 36 that align with corresponding notches 38 in the base 12. These notches 36, 38 coincide with commonly used miter angles (e.g., 0°, 15°, 22.5°, 30°, and 45°).

Figure 2:
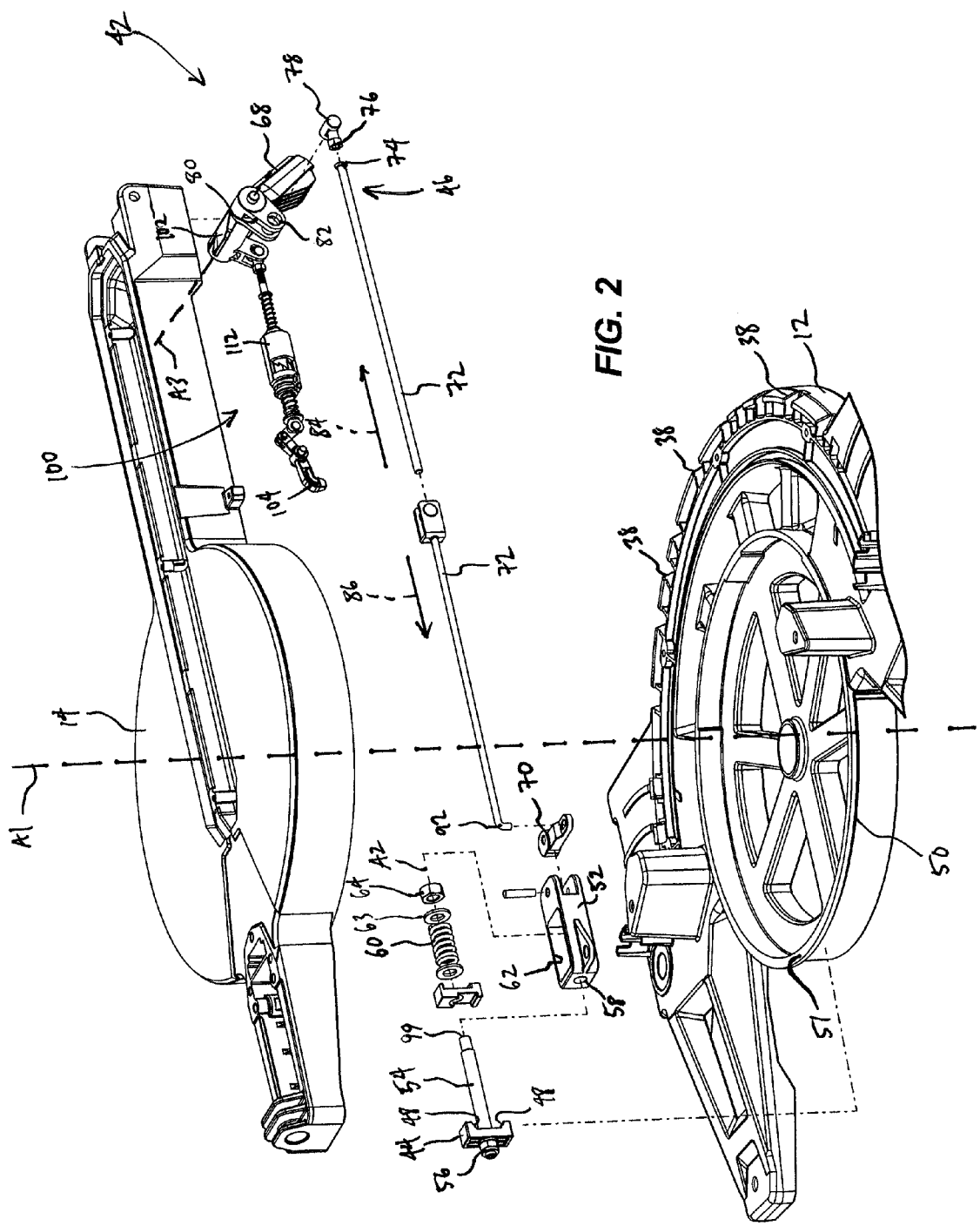
FIG. 2 is an exploded, top perspective view of a portion of the miter saw of FIG. 1, illustrating a base, a turntable, a miter angle lock assembly, and a miter angle detent assembly.

With reference to FIG. 2, the miter saw 10 further includes a miter angle lock assembly 42 for locking and unlocking the turntable 14 and the saw unit 18 relative to the base 12 about the miter axis A1. The miter angle lock assembly 42 includes a clamp 44 biased into engagement with a portion of the base 12 when in a clamped position (FIGS. 4 and 4A) for exerting a clamping force on the base 12, and an override assembly 46 for releasing the clamping force and maintaining the clamp 44 in a released position (FIGS. 3 and 3A) relative to the base 12. Accordingly, when the clamp 44 is in the released position, the turntable 14 may be pivoted about the miter axis A1 relative to the base 12 to any desired miter angle to perform a cutting operation on a workpiece.

Figure 3:
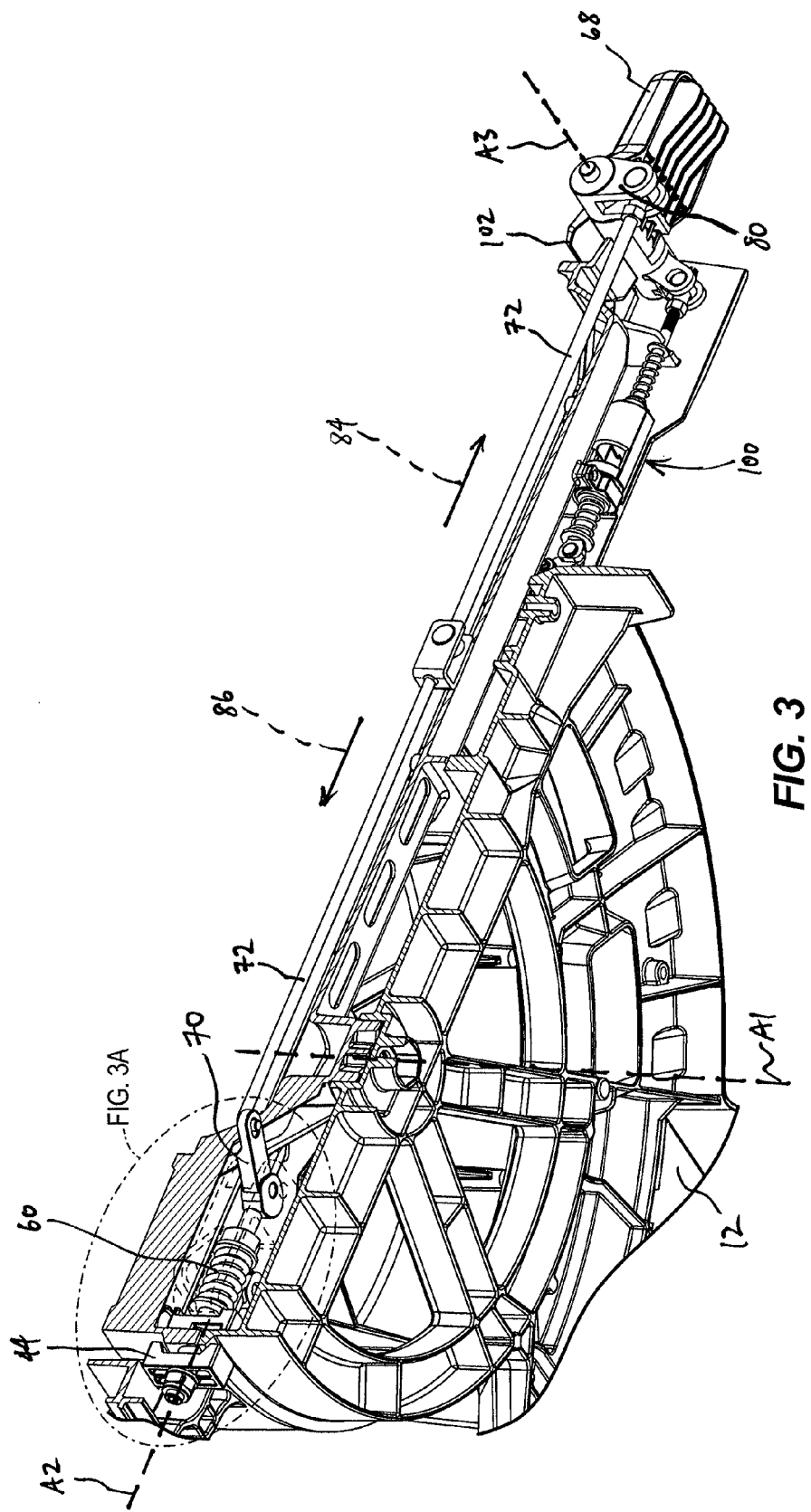
FIG. 3 is an assembled, bottom perspective view of the portion of the miter saw of FIG. 2 with portions cut away, illustrating the miter angle lock assembly in an unlocked state.
Figure 3A:
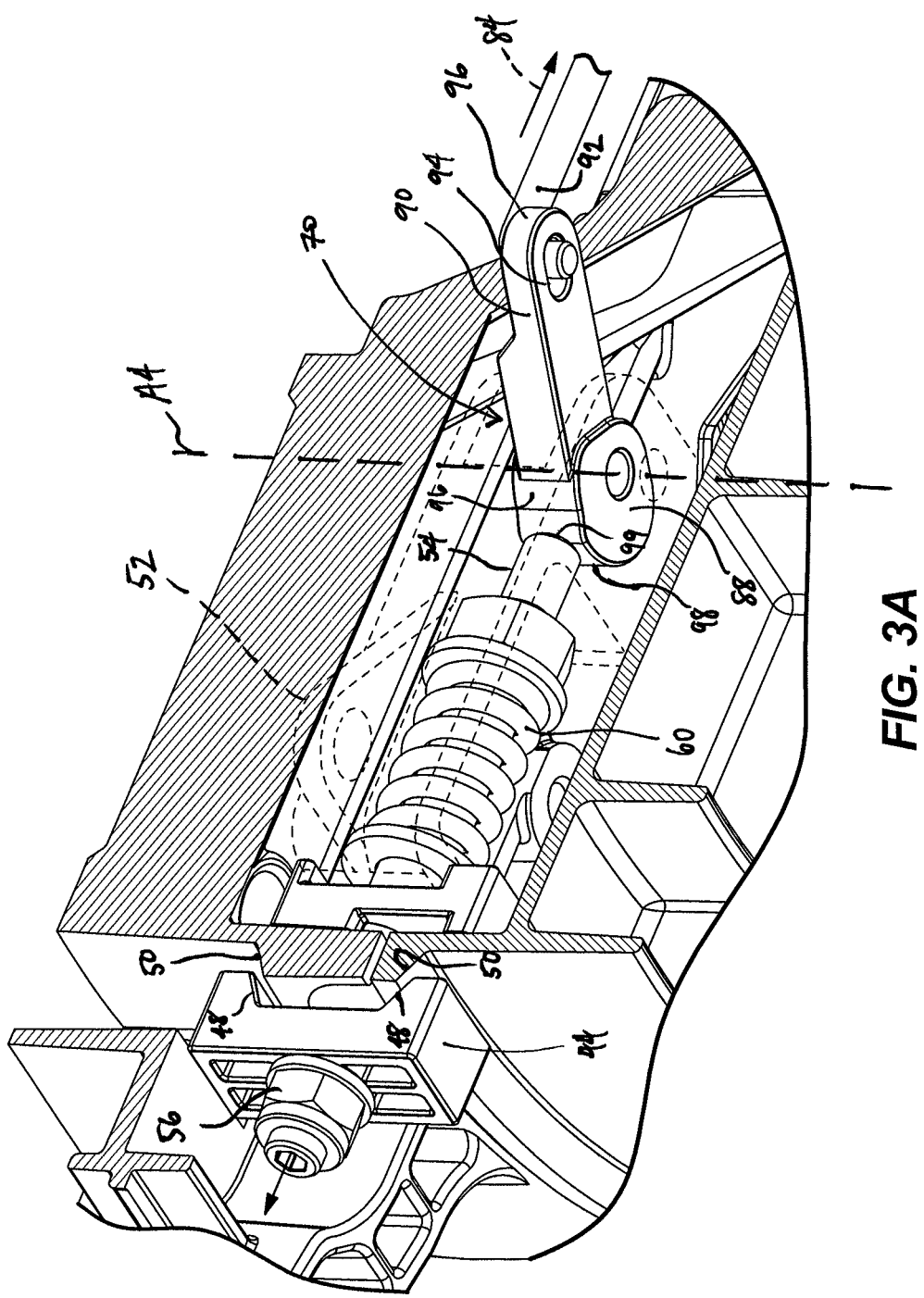
FIG. 3A is an enlarged perspective view of a portion of the miter angle lock assembly of FIG. 3.
Figure 4:
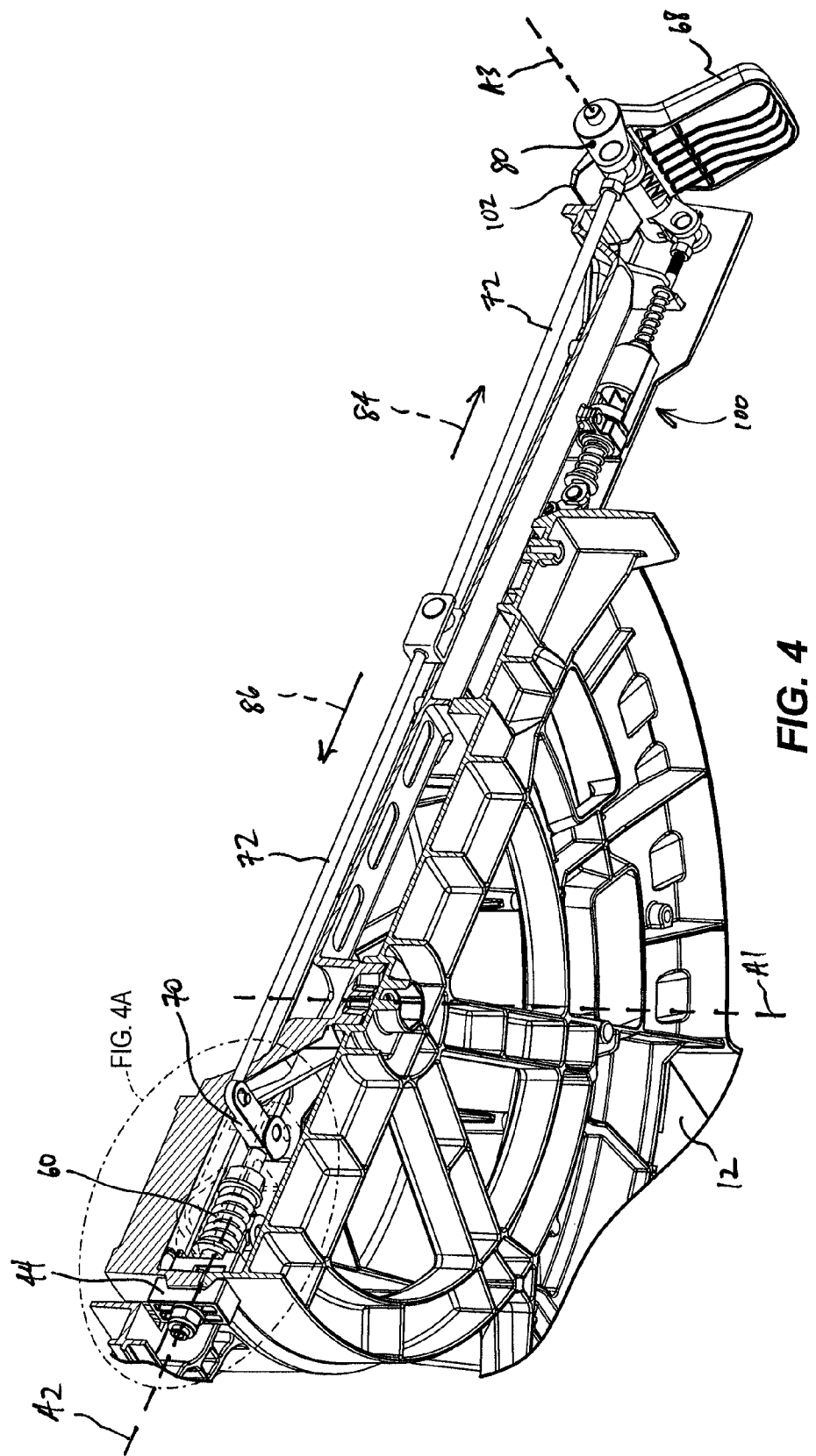
FIG. 4 is an assembled, bottom perspective view of the portion of the miter saw of FIG. 2 with portions cut away, illustrating the miter angle lock assembly in a locked state.
Figure 4A:
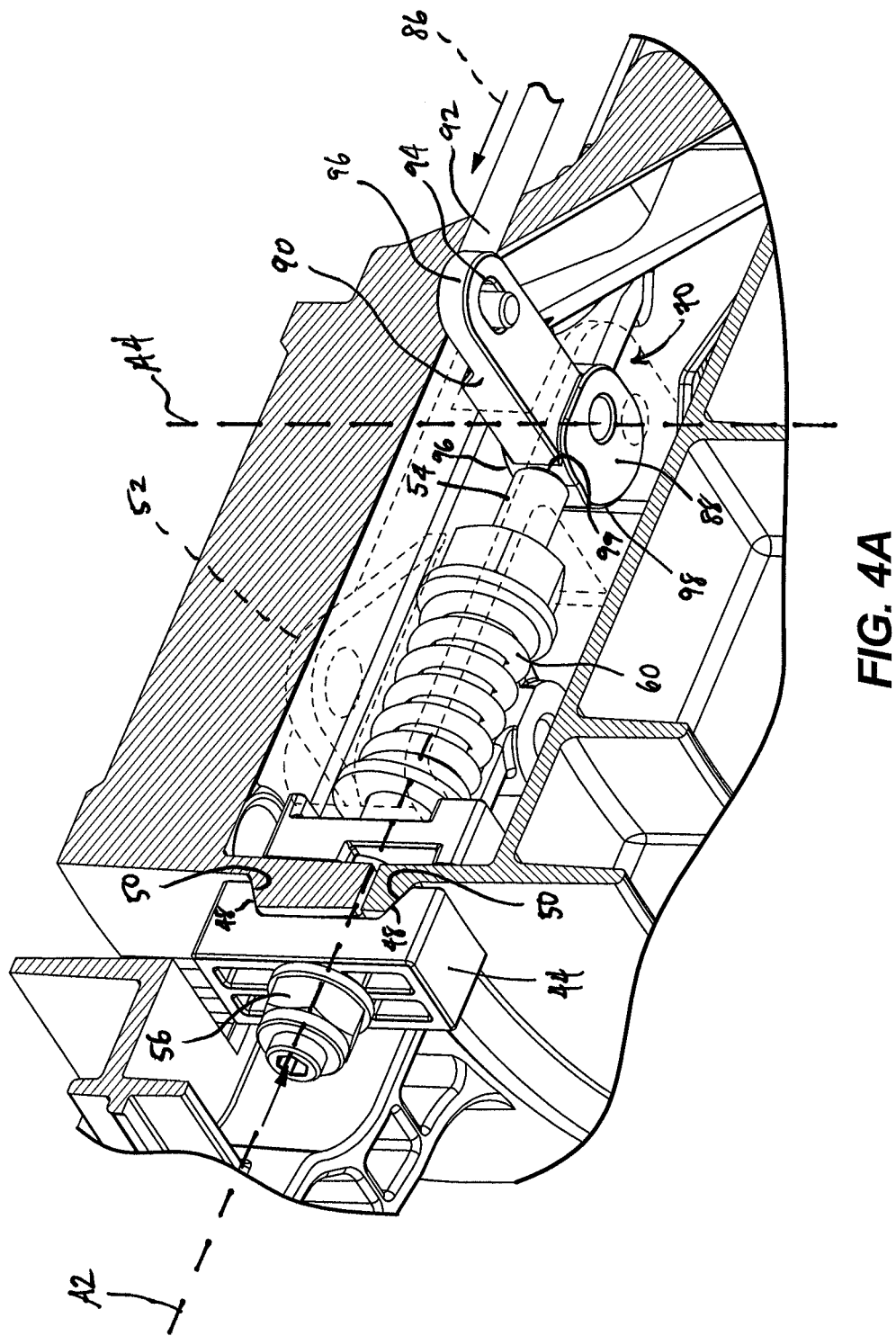
FIG. 4A is an enlarged perspective view of a portion of the miter angle lock assembly of FIG. 4.

In the illustrated embodiment of the miter angle lock assembly 42, the clamp 44 includes opposed beveled surfaces 48 that selectively (and simultaneously) engage, respectively, inverse-tapered surfaces 50 defined on the turntable 14 and the base 12, respectively (FIGS. 3A and 4A). As a result, when the clamp 44 is in the clamped position, the tapered surfaces 48 on the clamp 44 wedge against the inverse-tapered surfaces 50 defined on the turntable 14 and the base 12, respectively, thereby creating friction between the turntable 14, the clamp 44, and the base 12 that is sufficiently high enough to rotationally lock the turntable 14 to the base 12. Alternatively, the clamp 44 may also include features (e.g., knurls, ribs, etc.) on the tapered surfaces 48 and the inverse-tapered surfaces 50 on the turntable 14 and base 12, respectively, may include like or different features for increasing the amount of friction that can be developed between the turntable 14, the clamp 44, and the base 12 upon application of the clamping force. With reference to FIG. 2, the inverse-tapered surface 50 is annular and coaxial with the miter axis A1, and is defined on an arcuate portion 51 of the base 12 positioned behind the miter axis A1 (with the miter angle scale 34 attached to the base 12 in front of the miter axis A1 from the frame of reference of FIG. 1).

With reference to FIGS. 2-4A, the miter angle lock assembly 42 also includes a housing 52 attached to the underside of the turntable 14 (e.g., by fasteners) and a follower stud 54, which has a threaded rear end to which the clamp 44 is attached (e.g., by a nut 56) and a threaded front end 66, and which is received in coaxial bores 58 in the housing 52 (only one of which is shown in FIG. 2) for sliding movement therewith along an axis A2 oriented transverse to the miter axis A1 (FIG. 3). With reference to FIG. 2, the miter angle lock assembly 42 further includes a compression spring 60 positioned within a pocket 62 in the housing 52 that is coaxially mounted with the follower stud 54 and an adjustable retainer (e.g., a washer 63 and nut 64) secured to the threaded front end 66 of the follower stud 54. Accordingly, the spring 60 is captured between a rear surface of the pocket 62 and the retainer which, when adjusted (e.g., by rotating the nut 64), can change the preload of the compression spring 60 and the magnitude of the resultant clamping force exerted by the clamp 44. The threaded front end 66 of the follower stud 54 protrudes from the forward-most of the bores 58 in the housing 52, the reason for which is described in detail below.

With reference to FIG. 2, the override assembly 46 includes an actuator (e.g., handle 68) pivotably coupled to the turntable 14, at a location forward of the miter axis A1, about an axis A3 oriented transverse to both the miter axis A1 and the clamp axis A2. The override assembly 46 also includes a cam 70 pivotably coupled to the turntable 14 (via the housing 52) about an axis A4 (FIG. 3A) parallel to the miter axis A1 and transverse to the handle axis A3, and a linkage 72 (FIG. 2) interconnecting the handle 68 and the cam 70. Specifically, the linkage 72 includes a threaded front end 74 to which a nut 76 having a cylindrical pivot 78 is threaded, and the handle 68 includes parallel tabs 80 in which coaxial circular apertures 82 are defined in which the cylindrical pivot 78 is received. Because the pivot 78 is offset from the handle axis A3, limited pivoting movement of the handle 68 is generally transmitted to the linkage 72 as translation in opposite directions 84, 86.

With reference to FIGS. 3A and 4A, the cam 70 includes a cam lobe 88 and a lever 90 coupled for co-rotation with the cam lobe 88 with which a rear end 92 of the linkage 72 is coupled. In the illustrated embodiment of the override assembly 46, the cam lobe 88 and the lever 90 are integrally formed as a single piece. Alternatively, the cam lobe 88 and the lever 90 can be formed as separate components and coupled for co-rotation in any of a number of different manners (e.g., by using fasteners, adhesives, an interference fit, etc.). With reference to FIGS. 3A and 4A, the cam 70 further includes a slot 94 disposed near at a distal end 96 of the lever 90 in which the rear end 92 of the linkage 72 is slidably received. More specifically, when the linkage 72 is translated forward along direction 84, the rear end of the linkage 92 is slidable within the slot 94 toward a front end of the slot 94 (FIG. 3A), whereas when the linkage 72 is translated rearward along direction 86, the rear end of the linkage 94 is slidable within the slot 94 toward a rear end of the slot 94 (FIG. 4A). The clearance provided by the slot 94 allows the generally translational movement of the linkage 72 to be transferred to the cam 70 as pivoting movement about the axis A4.

With reference to FIGS. 3A and 4A, the cam lobe 88 includes a low-lift portion 96 defining a first radial dimension between the axis A4 and an outer peripheral surface of the cam lobe 88, and a high-lift portion 98 defining a greater, second radial dimension between the axis A4 and the outer peripheral surface of the cam lobe 88. The cam lobe 88 is slidably engageable with a distal end 99 of the follower stud 54 which, as mentioned above, protrudes from the forward-most of the bores 58 in the housing 52, and which is maintained in contact with the cam lobe 88 by the compression spring 60. As a result, as the cam 70 pivots about the axis A4 and contact between the distal end 66 of the follower stud 54 and the cam lobe 88 transitions from the low-lift portion 96 to the high-lift portion 98, the follower stud 54 is displaced rearward against the bias of the compression spring 60. Likewise, as the cam 70 pivots in an opposite direction about the axis A4 and contact between the distal end 99 of the follower stud 54 and the cam lobe 88 transitions from the high-lift portion 98 to the low-lift portion 96, the compression spring 60 rebounds and urges the follower stud 54 toward the cam lobe 88 in order to maintain constant contact between the distal end 99 of the follower stud 54 and the cam lobe 88. Because the clamp 44 is affixed to the rear end of the follower stud 54, the clamp 44 is also displaced in unison with the follower stud 54 in response to pivoting movement of the cam 70.

In operation, the miter angle lock assembly 42 is user-manipulatable between an unlocked state in which an operator may freely adjust the miter angle of the saw unit 18 (FIG. 3A), and a locked state in which the saw unit 18 is maintained at a specific miter angle (FIG. 4A). To adjust the miter angle lock assembly 42 from the unlocked state to the locked state, an operator pivots the handle 68 about the handle axis A3 from the generally horizontal orientation shown in FIG. 3 to the oblique orientation shown in FIG. 4. As the handle 68 pivots, the linkage 72 is translated rearward along direction 86, causing the cam 70 to pivot about the axis A4 and the distal end 99 of the follower stud 54 to slide along the cam lobe 88 from the high-lift portion 98 to the low-lift portion 96. As contact between the cam lobe 88 and the distal end 99 of the follower stud 54 transitions from the high-lift portion 98 to the low-lift portion 96, the radial dimension of which is less than the radial dimension of the high-lift portion 98, the compression spring 60 progressively rebounds and continues to urge the distal end 99 of the follower stud 54 against the cam lobe 88. As the compression spring 60 rebounds, the clamp 44 moves in unison with the follower stud 54. The gap between the tapered surfaces 48 of the clamp 44 and the inverse-tapered surfaces 50 of the turntable 14 and the base 12, respectively, progressively narrows until the surfaces 48, 50 engage the clamp 44, thereby wedging against both the turntable 14 and the base 12 (shown in FIGS. 4 and 4A). Thereafter, the clamping force exerted on the turntable 14 and base 12 by the clamp 44 creates friction between the turntable 14 and base 12, locking the turntable 14 relative to the base 12 in a desired miter angle of the saw unit 18.

When an operator desires to adjust the miter angle of the saw unit 18, the handle 68 is pivoted from the oblique orientation shown in FIG. 4 to the generally horizontal orientation shown in FIG. 3. As the handle 68 pivots, the linkage 72 is translated forward along direction 84, causing the cam 70 to pivot about the axis A4 and the distal end 99 of the follower stud 54 to slide along the cam lobe 88 from the low-lift portion 96 to the high-lift portion 98. As contact between the cam lobe 88 and the distal end 99 of the follower stud 54 transitions from the low-lift portion 96 to the high-lift portion 98, the radial dimension of which is greater than the radial dimension of the low-lift portion 96, the follower stud 54 is displaced rearward and the compression spring 60 is progressively compressed. The spring 60, however, continues to urge the distal end 99 of the follower stud 54 against the cam lobe 88. Because the clamp 44 moves in unison with the follower stud 54, as the compression spring 60 is compressed, the magnitude of the clamping force exerted on the turntable 14 and the base 12 by the clamp 44 is reduced. Eventually, a gap opens between the tapered surfaces 48 of the clamp 44 and the inverse-tapered surfaces 50 of the turntable 14 and the base 12, respectively, permitting the miter angle of the turntable 14 to be freely adjusted relative to the base 12. The miter angle lock assembly 42 may be used to secure the turntable 14 relative to the base 12 when the desired miter angle coincides with one of the notches 36 in the miter angle scale 34, or when the desired miter angle does not coincide with one of the notches 36.

Figure 5:
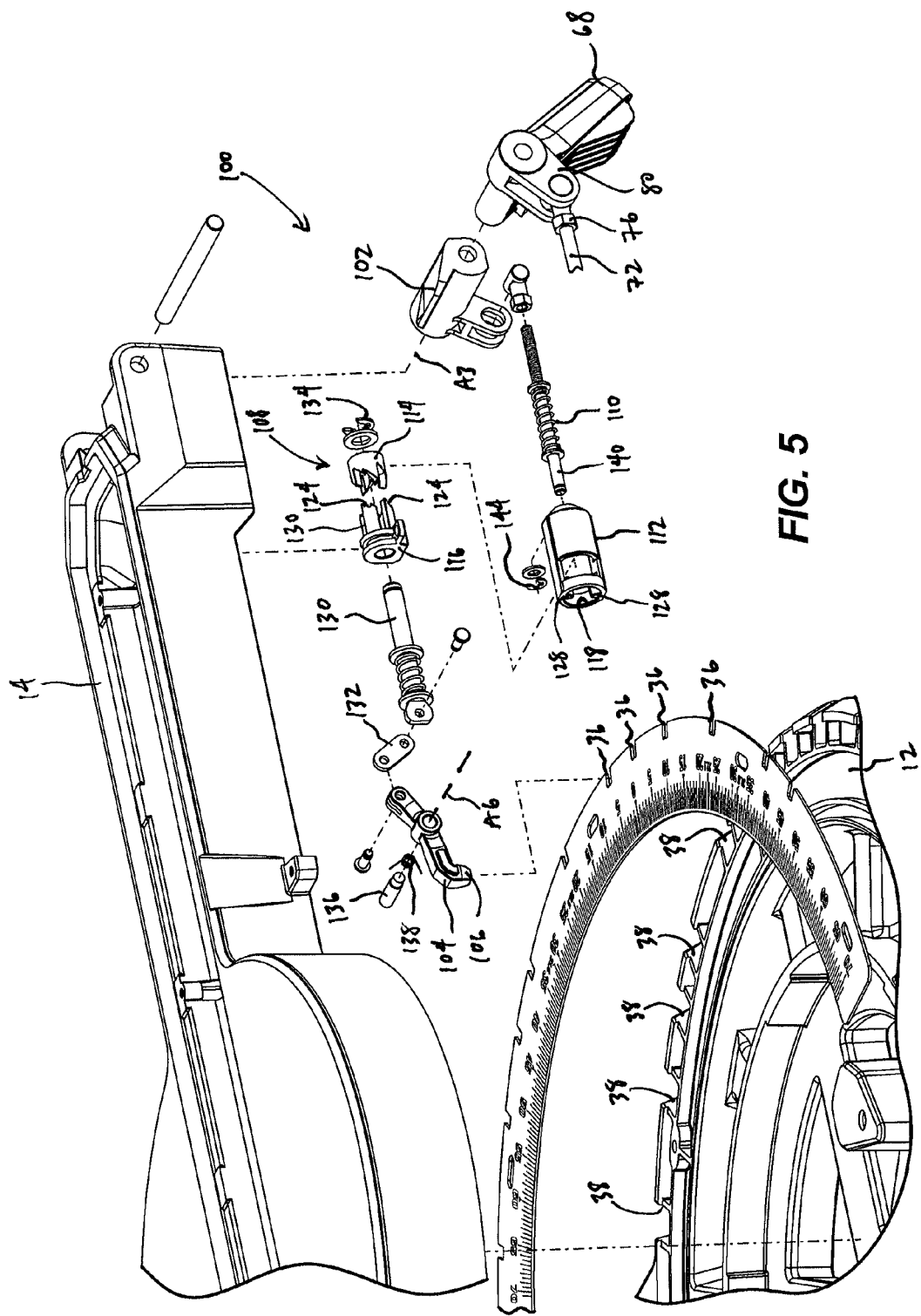
FIG. 5 is an exploded perspective view of the miter saw of FIG. 1, illustrating the base, the turntable, and a miter angle detent assembly.
Figure 6:
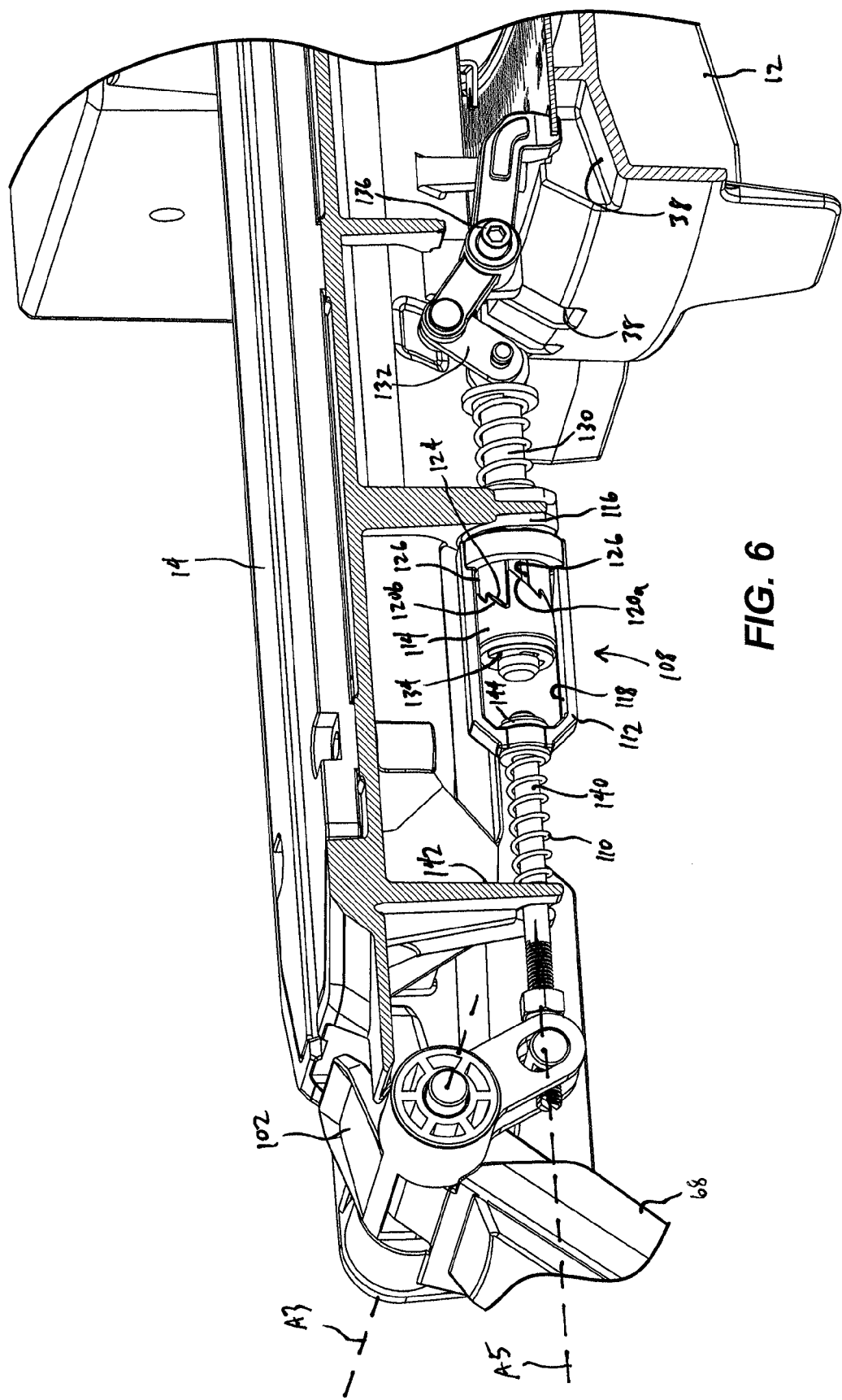
FIG. 6 is an assembled, side view of the miter saw of FIG. 1 with portions cut away, illustrating the miter angle detent assembly in an enabled state.
Figure 7:
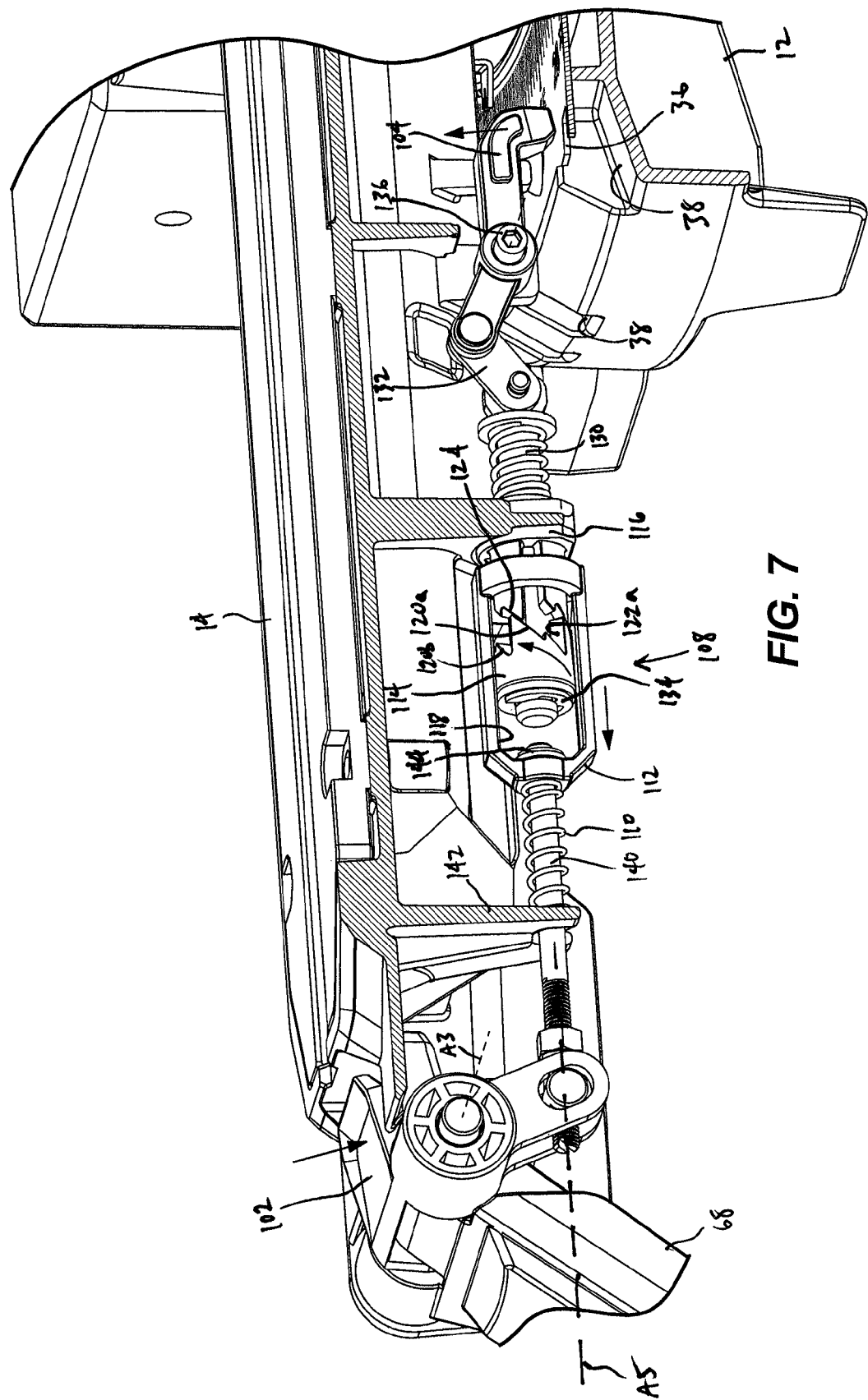
FIG. 7 is a side view of the miter angle detent assembly of FIG. 6 moving from the enabled state toward a disabled state.

With reference to FIGS. 2 and 5, the miter saw 10 also includes a miter angle detent assembly 100 for positioning the turntable 14 and saw unit 18 relative to the base 12 at specified miter angles coinciding with the notches 36 in the miter angle scale 34. The miter angle detent assembly 100 includes an actuator or lever 102 (FIG. 5) pivotably coupled to a front end of the turntable 14, a detent member 104 pivotably coupled to the turntable 14 and having a distal end 106 selectively receivable in the notches 36, and a bi-stable cam mechanism 108 interconnecting the lever 102 and the detent member 104. The lever 102 is depressible or pivotable about axis A3 between a first or "default" position (FIG. 6) and a second or "actuated" position (FIG. 7). The lever 102 is biased toward the default position of FIG. 6 by a compression spring 110.

Figure 8:
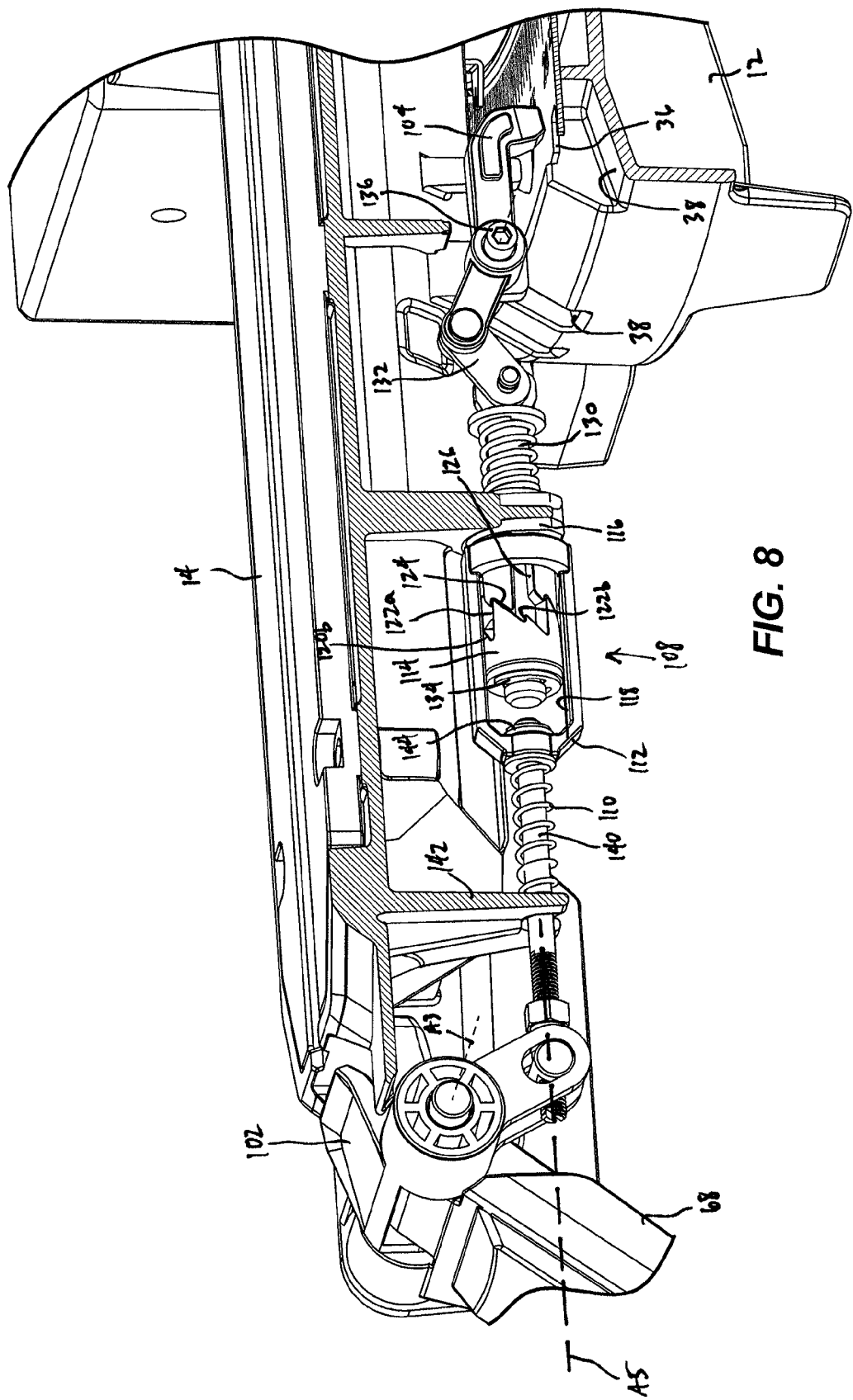
FIG. 8 is a side view of the miter angle detent assembly of FIG. 6 in the disabled state.

Referring to FIG. 5, the bi-stable cam mechanism 108 includes a thrust body 112, a cylindrical first cam member 114 moveable in response to actuation by the thrust body 112, and a second cam member 116 affixed to the turntable 14 and engageable with the first cam member 114. With reference to FIG. 6, the first cam member 114 is received within a corresponding shaped blind bore 118 in the thrust body 112, and the first cam member 114 includes two sets of cam surfaces 120a, 120b spaced about the cylindrical periphery of the cam member 114. The first set of cam surfaces 120a are located at the distal end of the cam member 114, and the second set of cam surfaces 120b are angularly offset relative to the first set of cam surfaces 120a. Furthermore, the second set of cam surfaces 120b are axially inset from the distal end of the first cam member 114 and the first set of cam surfaces 120a. Both sets of cam surfaces 120a, 120b are oriented at an oblique angle relative to a rotational axis A5 of the first cam member 114, the significance of which is explained in further detail below. With reference to FIG. 8, the first cam member 114 also includes sets of stop surfaces 122a, 122b that are alternately positioned about the periphery of the first cam member 114 that separate the cam surfaces 120a, 120b from each other. The stop surfaces 122a, 122b are oriented parallel to the rotational axis A5 of the first cam member 114.

With reference to FIG. 6, the second cam member 116 includes a single set of cam surfaces 124 spaced about the cylindrical periphery of the cam member 116 that are located at the distal end of the cam member 116, and a set of stop surfaces 126 adjacent the cam surfaces 124. Like the cam surfaces 120a, 120b, the cam surfaces 124 are oriented at an oblique angle relative to the rotational axis A5 of the first cam member 114 and are parallel to the cam surfaces 120a, 120b. The set of cam surfaces 124 of the second cam member 116 selectively and alternately interface with the first and second sets of cam surfaces 120a, 120b of the first cam member 114, as is described in further detail below. Furthermore, the stop surfaces 126 of the second cam member 116 selectively and alternately interface with the first and second sets of stop surfaces 122a, 122b of the first cam member 114, as is described in further detail below.

As illustrated in FIG. 5, the thrust body 112 includes an opposed set of radially inward extending protrusions 128 that are slideably received within corresponding slots 130 (only the upper of which is shown in FIG. 5) in the second cam member 116. Forward ends of the protrusions 128 are alternately engageable with the sets of cam surfaces 120a, 120b on the first cam member 114 for rotating the first cam member 114 within the thrust body 112 at discrete angular increments (e.g., by 90 degrees) for each instance that the lever 68 is depressed.

Referring to FIGS. 5 and 6, the miter angle detent assembly 100 also includes a rod 130 pivotably coupled to the detent member 104 by an intermediate link 132. The first cam member 114 is axially retained to the rod 130 by a retainer (e.g., a C-clip 134), yet is rotatable relative to the rod 130. The rod 130, in turn, is constrained for axial movement whereas the detent member 104 is constrained for pivotal movement about a pin 136 defining an axis A6, which is parallel with the pivot axis A3 of the lever 102. As such, axial movement of the rod 130 causes corresponding pivoting movement of the detent member 104 between an engaged position (FIG. 6), in which the distal end 106 of the detent member 104 is receivable within one of the notches 36, and an override or disengaged position (FIG. 8), in which the distal end 106 of the detent member 104 is removed from the notch 36 in which it was formerly received and prevented from re-engaging any of the other notches 36 in the miter angle scale 34. A torsion spring 138 (FIG. 5) is positioned between the detent member 104 and the turntable 14 for biasing the detent member 104 toward the engaged position.

With reference to FIGS. 5 and 6, the miter angle detent assembly 100 further includes a linkage, which includes another rod 140, interconnecting the lever 102 with the thrust body 112. Like the rod 130, the rod 140 is constrained for axial movement in operation of the miter angle detent assembly 100. Accordingly, the thrust body 112 translates with the rod 140 when the lever 102 is depressed and pivoted between the default position (FIG. 6) and the actuated position (FIG. 7). By urging the lever 102 via the compression spring 110 toward the default position, the compression spring 110 correspondingly urges the rod 140 and the thrust body 112 in a rearward direction toward the miter angle scale 34. In the illustrated embodiment of the miter angle detent assembly 100, the compression spring 110 is captured between a downwardly extending tab 142 on the turntable 14 and the thrust body 112 which, in turn, is retained to the rod 140 by a retainer (e.g., a C-clip 144).

In operation, the miter angle detent assembly 100 is user-manipulatable to selectively position the turntable 14 and saw unit 18 in a number of commonly used miter angles. Once the turntable 14 and saw unit 18 are positioned in one of the miter angles coinciding with the notches 36 in the miter angle scale 34, the miter angle lock assembly 42 may be engaged or placed in the locked state as described above to positively lock the turntable 14 relative to the base 12 at the selected miter angle for executing a cutting operation. To reposition the turntable 14 and saw unit 18 to another miter angle, the miter angle lock assembly 42 is first disengaged or placed in the unlocked state as described above. Depending upon whether another commonly used miter angle or an uncommon miter angle (i.e., a miter angle not associated with any of the notches 36 in the miter angle plate 34) is desired, the miter angle detent assembly 100 may or may not be shifted from an engaged state in which the detent member 104 is receiveable in one of the notches 36 in the miter angle scale 34 (FIG. 6) to a disengaged state in which the detent member 104 is removed from the notch 36 in which it was formerly received and prevented from re-engaging any of the other notches 36 in the miter angle scale 34.

For example, if another commonly used miter angle is desired, the miter angle detent assembly 100 may remain in the engaged state, and the operator of the miter saw 10 needs only to apply a lateral force against the turntable 14 (at a location spaced from the miter axis A1) that is sufficiently high enough to cause the distal end 106 of the detent member 104 to slide out of the notch 36 in which it was formerly received. In other words, because the distal end 106 of the detent member 104 is tapered, a component of the reaction force applied to the tapered distal end 106 by the miter angle scale 34 is directed upward, thereby imparting a moment on the detent member 104 in a counter-clockwise direction from the frame of reference of FIG. 6 (against the bias of the torsion spring 138) to slightly pivot the detent member 104. This slight pivoting movement by the detent member 104 is transferred to the rod 130 through the intermediate link 132, which in turn slightly displaces the rod 132 in a forward direction to unseat the C-clip 134 from the first cam member 114. The detent member 104 only needs to pivot a slight amount until the distal end 106 can slide out of the notch 36. Thereafter, the distal end 106 is slidable along the upper surface of the miter angle scale 34 until another of the commonly used miter angles is approached, at which time the torsion spring 138 unwinds to pivot the distal end 106 of the detent member 104 into the notch 36 coinciding with that particular miter angle. In this manner, the turntable can be moved and stopped at each of the notches 36 coinciding with commonly used miter angles until the desired miter angle is reached.

Should the operator desire to bypass more than one of the notches 36 in the miter scale 34, or should the operator desire to reposition the turntable 14 into an uncommon miter angle, the miter angle detent assembly 100 may be shifted from the engaged state (FIG. 6) to the disengaged state by pressing and releasing the lever 102 a first instance against the bias of the compression spring 110, which displaces the rod 140 and the thrust body 112 forward and away from the miter angle scale 34 (FIG. 7). As the thrust body 112 is displaced relative to the second cam member 116, the protrusions 128 slide against one of the sets of cam surfaces 120a, causing the first cam member 114 to be displaced away from the miter angle scale 34 in unison with the thrust body 112. Because the cam surfaces 120a are oriented at an oblique angle with respect to the rotational axis A5 of the first cam member 114, the linear force imparted by the protrusions 128 upon the cam surfaces 120a is divided into a linear component, which causes the displacement of the first cam member 114 described above, and a tangential component, which imparts rotation to the first cam member 114 simultaneously with its axial displacement. As a result, the first cam member 114 is rotationally incremented about the rod 130 (e.g., by 90 degrees) to an orientation in which the first set of cam surfaces 120a are engaged with the cam surfaces 124 of the second cam member 116, and the stop surfaces 122a are engaged with the stop surfaces 126 of the second cam member 116, thereby elongating the effective length of the nestled cam members 114, 116 (FIG. 8). Because the first cam member 114 is axially retained to the rod 130 by the C-clip 134, the rod 130 is also displaced away from the miter angle scale 34, pulling the intermediate link 132 (which undergoes both translation and rotation relative to the turntable 14) and pivoting the detent member 104 in a counter-clockwise direction relative to the frame of reference of FIG. 7 against the bias of the torsion spring 138 from the engaged position (FIG. 6) to the disengaged position (FIG. 8). Once the cam members 114, 116 are oriented as shown in FIG. 8, the detent member 104 is maintained in the disengaged position indefinitely, permitting the turntable 14 to be freely pivoted relative to the base 12 about the miter angle A1 without concern for the detent member 104 re-engaging any of the notches 36 in the miter angle scale 34.

Figure 9:
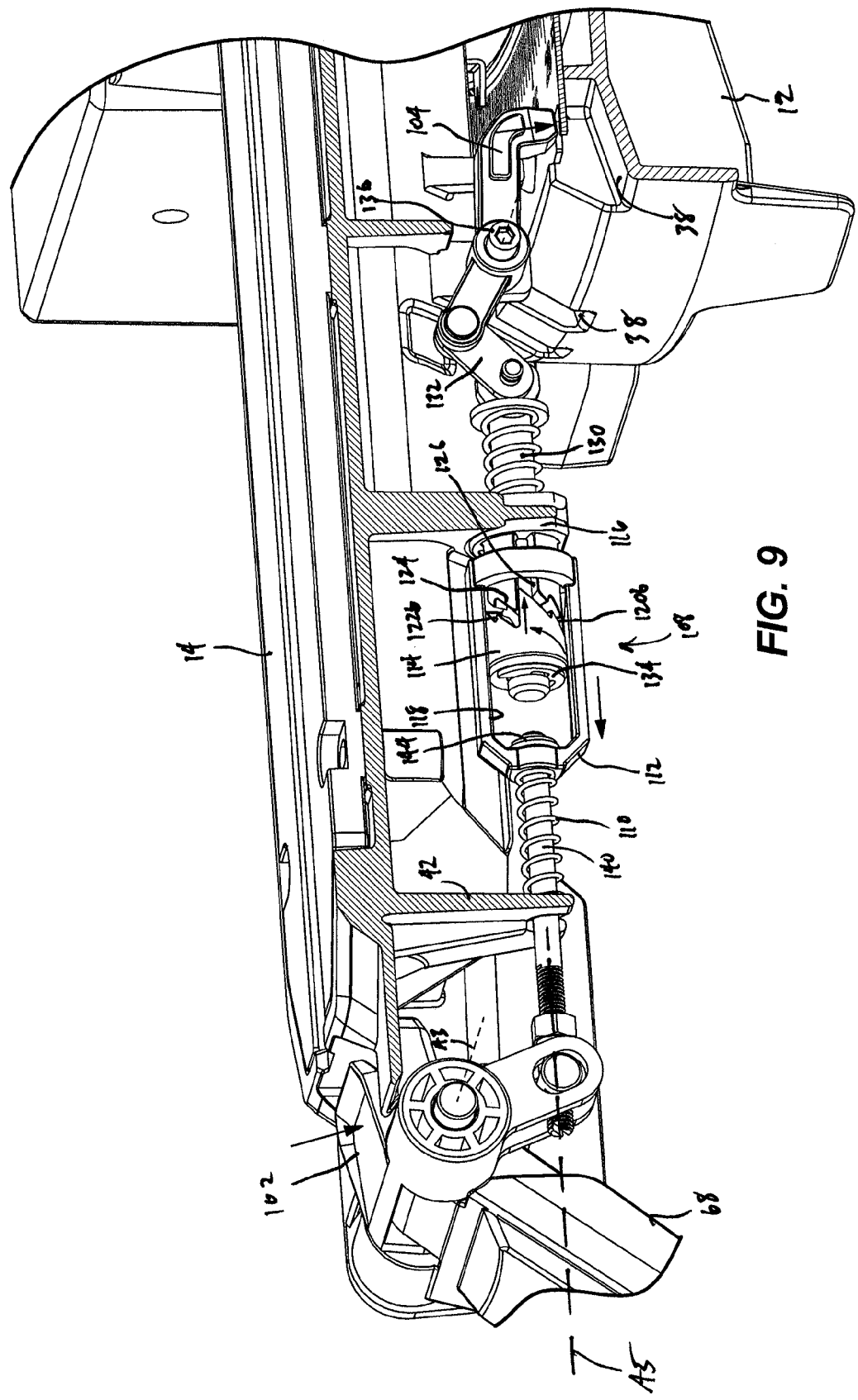
FIG. 9 is a side view of the miter angle detent assembly of FIG. 6 moving from the disabled state toward the enabled state.

To return the miter angle detent assembly 100 to the engaged state, the lever 102 is pressed and released a second instance against the bias of the compression spring 110. This time, as the rod 140 and the thrust body 112 are displaced away from the miter angle scale 34, the protrusions 128 slide against one of the second sets of cam surfaces 120b, causing the first cam member 114 to be displaced away from the miter angle scale 34 in unison with the thrust body 112. Because the cam surfaces 120b are also oriented at an oblique angle with respect to the rotational axis A5 of the first cam member 114, the linear force imparted by the protrusions 128 upon the cam surfaces 120b is divided into a linear component, which causes the displacement of the first cam member 114 described above, and a tangential component, which imparts rotation to the first cam member 114 simultaneously with its axial displacement. As a result, the first cam member 114 is rotationally incremented about the rod 130 (e.g., by another 90 degrees in the same direction) to an orientation in which the second set of cam surfaces 120b are re-engaged with the cam surfaces 124 of the second cam member 116 (as shown in FIGS. 9 and 5), and the stop surfaces 122b are engaged with the stop surfaces 126 of the second cam member 116, thereby shortening the effective length of the nestled cam members 114, 116. Thereafter, the torsion spring 138 is permitted to unwind and pivot the detent member 104 in a clockwise direction relative to the frame of reference of FIG. 9 from the disengaged position to the engaged position (FIG. 6). If at this time the detent member 104 is not aligned with any of the notches 36 in the miter angle scale 34, the distal end 106 of the detent member 104 is slidable along the upper surface of the miter angle scale 34 until one of the commonly used miter angles is approached, at which time the torsion spring 138 unwinds further to pivot the distal end 106 of the detent member 104 into the notch 36 coinciding with that particular miter angle.

Various features of the invention are set forth in the following claims.

What is claimed is:

1. A miter saw comprising:
    a base;
    a turntable pivotably coupled to the base about a miter axis; and
    a miter angle lock assembly including
        a clamp biased into engagement with the base when in a clamped position, thereby exerting a clamping force on the base for locking the turntable relative to the base, and
        an override assembly for maintaining the clamp in a released position relative to the base in which the clamping force is released.

2. The miter saw of claim 1, wherein the miter angle lock assembly further includes a spring biasing the clamp into engagement with the base.

3. The miter saw of claim 2, wherein the miter angle lock assembly further includes a follower through which the clamping force is transmitted, and wherein the override assembly is operable to displace the follower and move the clamp to the released position against the bias of the spring.

4. The miter saw of claim 3, wherein the spring is coaxially mounted with the follower.

5. The miter saw of claim 4, wherein the follower includes a first end proximate the override assembly and a second end coupled to the clamp.

6. The miter saw of claim 5, wherein the miter angle lock assembly further includes a retainer positioned between the spring and the override assembly, and wherein the retainer is positioned along a length of the follower to preload the spring an amount sufficient to provide the clamping force.

7. The miter saw of claim 5, wherein the override assembly includes
    a cam lobe pivotably coupled to the turntable and engageable with the first end of the follower, and
    an actuator for pivoting the cam lobe relative to the turntable to displace the follower.

8. The miter saw of claim 7, wherein the override assembly further includes a lever coupled for co-rotation with the cam lobe.

9. The miter saw of claim 8, wherein the override assembly further includes a linkage interconnecting the lever and the actuator.

10. The miter saw of claim 9, wherein the actuator is pivotably coupled to the turntable, and wherein pivoting movement of the actuator is transferred by the linkage to the cam lobe as pivotal movement.

11. The miter saw of claim 10, wherein the cam lobe is pivotable about a first axis parallel to the miter axis.

12. The miter saw of claim 11, wherein the actuator is pivotable about a second axis transverse to both the miter axis and the first axis.

13. The miter saw of claim 7, wherein the cam lobe includes a first portion defining a first radial dimension, wherein the cam lobe includes a second portion defining a second radial dimension greater than the first radial dimension, and wherein the clamp is moved from the clamped position to the released position in response to contact between the first end of the follower and the cam lobe transitioning from the first portion to the second portion.

14. The miter saw of claim 13, wherein the clamp is moved from the released position to the clamped position in response to contact between the first end of the follower and the cam lobe transitioning from the second portion to the first portion of the cam lobe.

15. The miter saw of claim 1, wherein the base includes an arcuate portion with which the clamp is engaged when in the clamped position.

16. The miter saw of claim 15, wherein the arcuate portion includes an annular surface with which a first portion of the clamp is engaged when in the clamped position.

17. The miter saw of claim 16, wherein the turntable includes a turntable surface with which a second portion of the clamp is engaged when in the clamped position.

18. The miter saw of claim 17, wherein engagement of the first and second portions of the clamp with the annular surface and the turntable surface, respectively, occurs simultaneously.

19. The miter saw of claim 15, wherein the override assembly includes an actuator positioned proximate a front of the turntable.

20. The miter saw of claim 19, wherein the arcuate portion and the actuator are positioned on opposite sides of the miter axis.

* * * * *